(12) United States Patent
Shen et al.

(10) Patent No.: US 6,932,611 B2
(45) Date of Patent: Aug. 23, 2005

(54) CONDUCTING REMOTE INSTRUCTOR-CONTROLLED EXPERIMENTATION

(75) Inventors: Hong Shen, Plainsboro, NJ (US); Michael Shur, Latham, NY (US); Tor Fjeldly, Oslo (NO)

(73) Assignee: Rensselaer Polytechnic Institute, Troy, NY (US)

( * ) Notice: Subject to any disclaimer, the term of this patent is extended or adjusted under 35 U.S.C. 154(b) by 385 days.

(21) Appl. No.: 10/343,516

(22) PCT Filed: Jul. 31, 2001

(86) PCT No.: PCT/US01/23944

§ 371 (c)(1),
(2), (4) Date: Jan. 31, 2003

(87) PCT Pub. No.: WO02/10883

PCT Pub. Date: Feb. 7, 2002

(65) Prior Publication Data

US 2003/0207243 A1 Nov. 6, 2003

Related U.S. Application Data

(60) Provisional application No. 60/222,428, filed on Aug. 1, 2000.

(51) Int. Cl.[7] ................................................ G09B 23/00
(52) U.S. Cl. ..................... 434/276; 434/118; 434/224; 434/350; 434/362; 709/203; 700/65
(58) Field of Search ........................... 434/118, 219, 434/224, 276, 307 R, 322, 323, 327, 350, 362, 365; 463/22; 700/18, 65; 707/500.1; 709/203, 204; 711/148; 714/57; 725/93

(56) References Cited

U.S. PATENT DOCUMENTS

| 4,776,798 | A | * | 10/1988 | Crawford ..................... 434/224 |
| 5,369,566 | A | * | 11/1994 | Pfost et al. ..................... 700/18 |
| 5,484,293 | A | | 1/1996 | Ford et al. |
| 5,528,281 | A | * | 6/1996 | Grady et al. ................... 725/93 |
| 5,549,117 | A | | 8/1996 | Tacklind et al. |
| 5,558,638 | A | | 9/1996 | Evers et al. |
| 5,790,977 | A | | 8/1998 | Ezekiel |
| 5,830,064 | A | * | 11/1998 | Bradish et al. ................ 463/22 |
| 5,841,975 | A | | 11/1998 | Layne et al. |
| 5,845,230 | A | | 12/1998 | Lamberson |
| 5,897,607 | A | | 4/1999 | Jenney et al. |
| 5,956,487 | A | | 9/1999 | Venkatraman et al. |
| 5,968,731 | A | | 10/1999 | Layne et al. |
| 6,006,260 | A | | 12/1999 | Barrick, Jr. et al. |
| 6,009,381 | A | | 12/1999 | Ono |
| 6,014,612 | A | | 1/2000 | Larson et al. |
| 6,022,315 | A | | 2/2000 | Hiff |
| 6,043,894 | A | | 3/2000 | Van Aken et al. |
| 6,046,696 | A | | 4/2000 | Blanco |
| 6,049,827 | A | | 4/2000 | Sugauchi et al. |
| 6,050,940 | A | | 4/2000 | Braun et al. |
| 6,085,227 | A | * | 7/2000 | Edlund et al. ............... 709/203 |
| 6,167,490 | A | * | 12/2000 | Levy et al. .................. 711/148 |
| 6,261,103 | B1 | | 7/2001 | Stephens et al. |
| 6,499,054 | B1 | * | 12/2002 | Hesselink et al. ........... 709/204 |
| 6,792,321 | B2 | * | 9/2004 | Sepe, Jr. ....................... 700/65 |
| 2002/0049782 | A1 | * | 4/2002 | Herzenberg et al. ..... 707/500.1 |
| 2004/0078733 | A1 | * | 4/2004 | Lewis .......................... 714/57 |

* cited by examiner

Primary Examiner—Joe H. Cheng
(74) Attorney, Agent, or Firm—RatnerPrestia

(57) ABSTRACT

The invention includes a method for a client to remotely conduct a laboratory experiment using a remote computer communicating with a host computer in a computer network. The experiment is stimulated by a set of input variable and provides a set of dependent output variables. The method includes the steps of an instructor setting up the experiment at a central location, determining a tolerance band for each input variable of the experiment, and restricting a range of each tolerance band. The instructor enters into the host computer a program to run the experiment. The client remotely access the experiment using the remote computer. The instructor enables the client to conduct the experiment and simultaneously limits the client to the range of each tolerance band.

20 Claims, 21 Drawing Sheets

FIG. 8

CONDUCTING REMOTE INSTRUCTOR-CONTROLLED EXPERIMENTATION

This application is a U.S. National Stage Application of PCT Application No. PCT/US01/23944 filed on Jul. 31, 2001.

This application claims the benefit of provisional application No. 60/222,428 filed Aug. 1, 2000.

TECHNICAL FIELD

The present invention relates, in general, to instructor-client communications using a computer network, and, more specifically, to a method of a client to conduct an experiment set up by an instructor using the computer network.

BACKGROUND OF THE INVENTION

Laboratory courses are a vital part of engineering and scientific education and training, but so far, lab courses have been considered impractical for remote education. Lab courses are traditionally conducted at a central location, with student, instructor, and experiment in close proximity to each other. On the other hand, user-friendly, computer-controlled instrumentation is revolutionizing the way measurements are being made, and is now permitting net-based techniques to be utilized for setting up remote instrument access.

An example of remote instrument access is U.S. Pat. No. 5,790,977, entitled "Data Acquisition From A Remote Instrument Via The Internet" issued Aug. 4, 1998 to Ezekiel. This patent describes the use of the World Wide Web to allow remote access from a host system to an instrument. In the cited patent, control and data acquisition software reside in the instrument. The software must first be forwarded to the host system before access to the instrument is possible. After receiving the software by way of the Internet, the host system is able to control the instrument.

Several companies offer software packages that permit remotely accessing and controlling instruments using the Internet. With the Internet Developer Toolkit from National Instruments, Inc., which is an add-on utility of LabVIEW, it is possible to create virtual instruments (VIs) with front panel user interfaces that are viewable from standard Web browsers. Both Componentworks from National Instruments, Inc. and HPVee from Hewlett Packard Co. supply ActiveX controls, which may be embedded in user applications and be suitable as the front end user interface for remote instrument control. ActiveX allows for the programming of simulated knobs, slides, and other elements commonly found on control panels of instruments. The ActiveX based applications use standard Web browsers, such as for example Internet Explorer from Microsoft Corporation.

As versatility of communications over the Internet increases, it is desirable to set up and modify experiments at a central location by an instructor. It is also desirable to allow a client or student to easily access the experiment from a remote location. Furthermore, it is desirable to allow the client or student flexibility in performing the experiment within guidelines controlled by the instructor.

SUMMARY OF THE INVENTION

To meet this and other needs, and in view of its purposes, the present invention provides a method for a client to remotely conduct a laboratory experiment using a remote computer communicating with a host computer in a computer network, the experiment including a set of output variables dependent on a set of input variables. The method comprises the steps of:

(a) an instructor setting up the experiment at a central location;

(b) the instructor determining a tolerance band for each input variable of the experiment;

(c) the instructor restricting a range of each tolerance band determined in step (b);

(d) entering into the host computer a program to run the experiment set up in step (a) and the range of each tolerance band restricted in step (c);

(e) the client remotely accessing the experiment using the remote computer; and (f) enabling the client to conduct the experiment and simultaneously limiting the client to the range of each tolerance band.

In another embodiment, the client is a student and the experiment may be in any subject relevant to a course taken by the student and taught by the instructor.

In yet another embodiment, the client remotely accesses the experiment by using a web browser in the remote computer to access the server of the host computer, and the experiment is run at the central location free of any program residing in the remote computer.

The host computer may communicate with more than one remote computer simultaneously, and may process more than one experiment request. Failure of a task from one experiment request cannot prevent performance of another task from a remote computer.

It is to be understood that both the foregoing general description and the following detailed description are exemplary, but are not restrictive, of the invention.

BRIEF DESCRIPTION OF THE DRAWINGS

FIG. 5 to FIG. 8 are examples of the input and output screens used by the student and the instructor to execute an embodiment of the method of the present invention.

DETAILED DESCRIPTION OF THE INVENTION

Figure 1A:
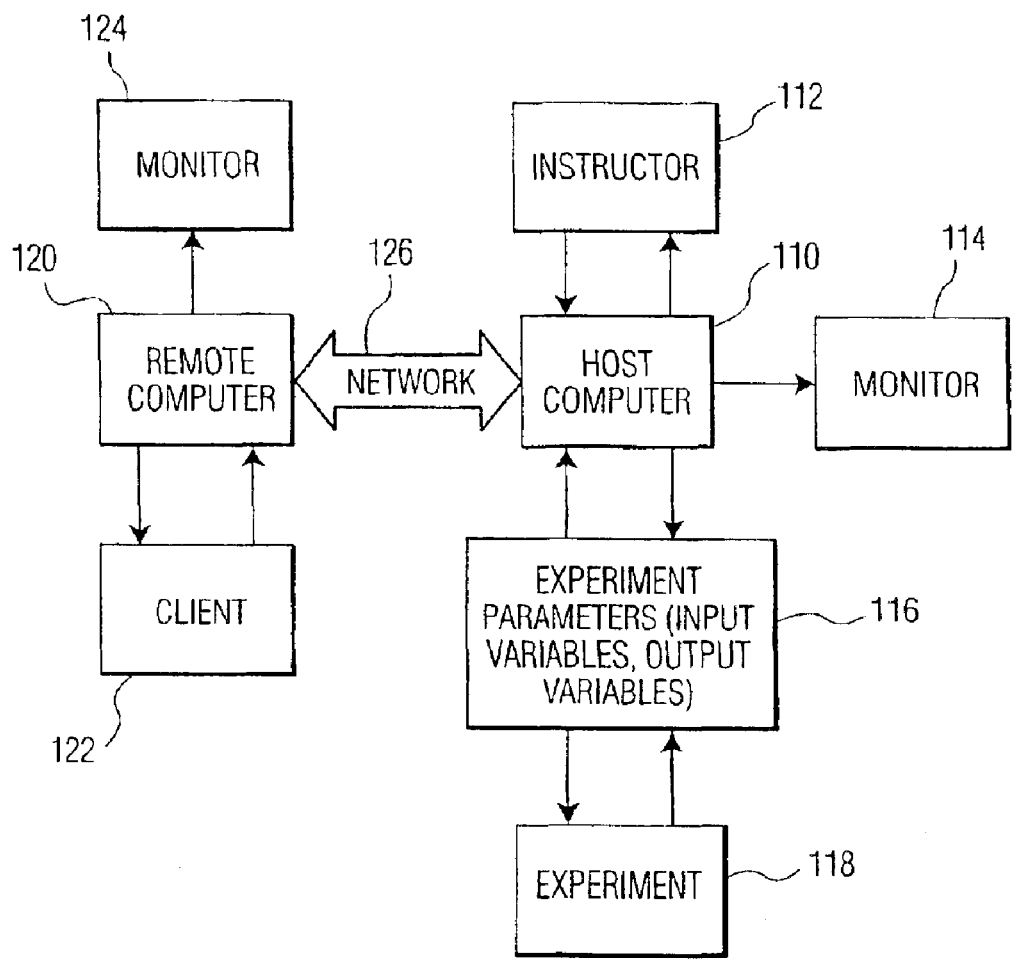
FIG. 1A is a block diagram of an embodiment of the system of the present invention.

Referring to FIG. 1A, there is shown a system for conducting remote instructor-controlled experimentation, generally designated as 100. System 100 includes at least one remote computer 120 and monitor 124 operated by client 122 to conduct a remote experiment using network 126.

Located at a central location are host computer 110 and monitor 114, which are operated by instructor 112. The instructor may set up and control experiment 118 at the central location.

Experiment 118, which may be conducted, for example, on a discrete or integrated circuit, is controlled by instructor 112 by way of host computer 110. Instructor 112 sets up the structural components and systems of the experiment and selects various parameters for the experiment, including input variables and output variables. As will be explained, instructor 112 determines a range for each input variable, within which client 122 may be allowed to stimulate experiment 118. Within guidelines set up by the instructor, the client may stimulate experiment 118 from remote computer 120 by way of network 126. Experiment 118 includes software and hardware components necessary to conduct the experiment defined by instructor 112. This may include instruments or devices that are controlled by host computer 110 in conducting the experiment. The instruments may, as in the exemplary embodiment, provide input voltage stimulation to the experiment, and may monitor an record output voltages from the experiment. Commercially available software may be loaded into host computer 110 to drive these instruments.

Figure 1B:
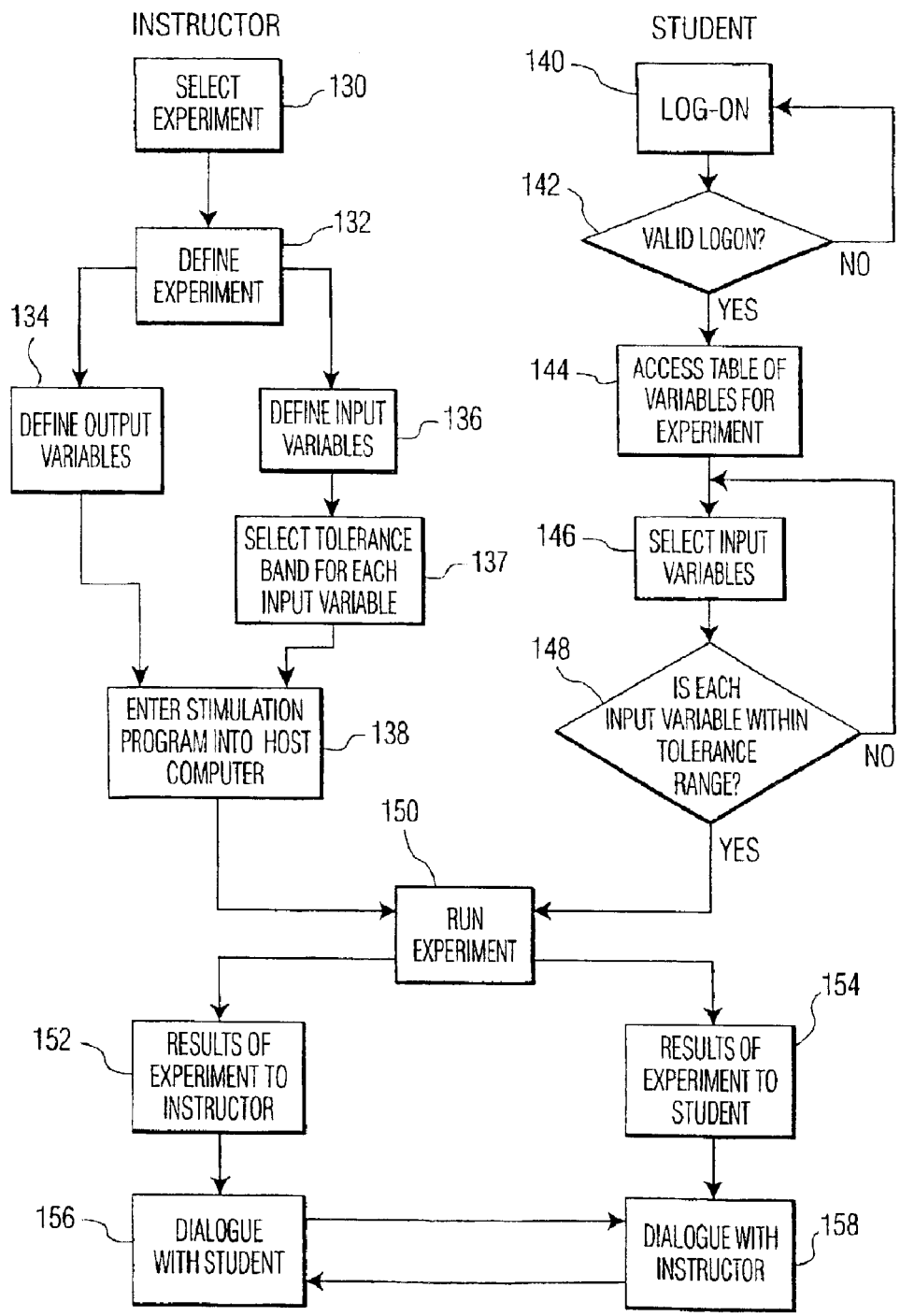
FIG. 1B is a flow diagram of a method of the present invention in which a student remotely accesses and conducts an experiment.

An exemplary embodiment of the method of the present invention is shown in FIG. 1B, generally designated as 170. In the embodiment shown, the client is a student. Beginning with step 130, the instructor selects an experiment. It will be appreciated that the experiment may be in any subject relevant to a course taken by the student and taught by the instructor. For example, in an electrical engineering course, the instructor may decide to set up an experiment for characterizing a semiconductor device. In step 132, the instructor defines the experiment, including its structural components. This may include partitioning the experiment into portions that may be implemented by software residing in host computer 110 and other portions that may require hardware, such as an integrated circuit. The instructor may define the independent variables and dependent variables of the experiment. The instructor may also define the input and output interface between experiment 118 and host computer 110.

Figure 3:
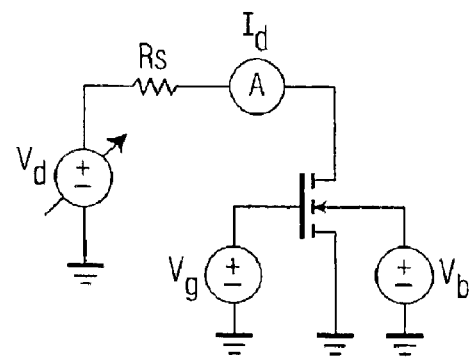
FIG. 3 depicts an experiment on an NMOS transistor, which can be conducted according to the present invention.
Figure 4:
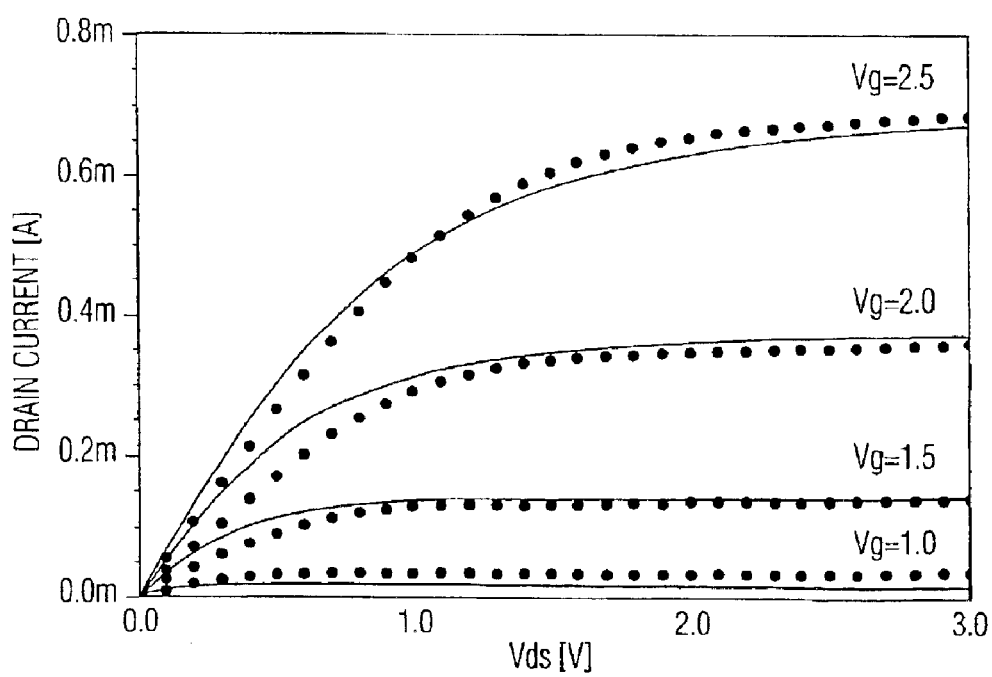
FIG. 4 is a plot of the $I_d$-$V_d$ characteristics of the circuit shown in FIG. 3.

In steps 134 and 136, the instructor defines the output and input variables of the experiment. By way of example, FIG. 3 depicts an experiment on an NMOS transistor. Various input variables are set up to control the transistor, namely, drain voltage ($V_d$), gate voltage ($V_g$), and base voltage ($V_b$). Drain current ($I_d$) is set up as an output variable. By varying these input variables, the output variable is also varied. The experiment may be used for studying various properties of the transistor, such as cut off voltage and departure from ideal theory. A plot of $I_d$-$V_d$ characteristics is shown in FIG. 4. The solid lines shown in FIG. 4 represent the ideal characteristics and the dotted lines represent the actual characteristics obtained by running the experiment. By comparing theoretical characteristics of the transistor with actual performance, a student may obtain a better appreciation in the operation of the transistor.

As part of defining the experiment, the instructor defines the range of tolerance bands for each input variable, in step 137. For the experiment shown in FIG. 3, the voltages are limited to acceptable ranges so that the student will not damage the transistor by exceeding these ranges. The instructor in step 138 loads a program, which includes the input and output variables, and tolerance bands of each input variable into the host computer to stimulate the experiment.

As will be explained, the instructor uses display screens, as shown for example in FIGS. 5A–5D, to define the experiments by creating experiment information files on the host computer. Each experiment information file contains one experiment configuration. A configuration contains a number of experiments. The information for each experiment may be the title of the experiment, and set up information for the experiment, such as voltage. New experiments may be added to the configuration and existing experiments may be removed from the configuration. The instructor may also set enabling conditions to permit and restrict student access to the experiments. Predetermined data from an experiment information file is sent from the host computer to a remote computer when a student logs on, to facilitate the student selecting and running an experiment.

As will be explained, multiple clients or students may remotely access the host computer to individually select an experiment and run the experiment. One student may select running one experiment and another student may select running a different experiment. By creating a task queue, multiple tasks from different students may be stacked in the task queue. Depending on predetermined criteria set up by the instructor, host computer 110 may prioritize the tasks on a first-in-first-out basis or on a student priority level. Each student may also be notified by the host computer of how many tasks are ahead of his or her task.

The student, using the remote computer, in step 140, logs onto the host computer. The logon is validated in step 142, which may include verification of the student, such as password verification, verification of whether the student has completed prior experiments, and other functions necessary to verify that the student is accessing the experiment pursuant to predefined enabling criteria. After successful logon, the student is presented in step 144 with screen 6A, showing the input variables and limits, for the selected experiment. For the exemplary experiment shown in FIG. 3, the student is shown voltage sources, as well as voltage limits. The student enters the values in step 146, and each value is checked as being within the tolerance band for that input variable, in step 148. If a value is entered that is outside the tolerance band, an error message may be displayed to the student, in a message window.

After the student enters valid values for the input variables, the experiment is run in step 150. For the exemplary experiment shown in FIG. 3, the NMOS $I_d$-$V_d$ characteristics are determined by applying a staircase sweep voltage ($V_d$) between drain and source of the transistor and the drain current is monitored. Voltage is applied between the gate and source ($V_g$) during each sweep, and a group of $I_d$-$V_d$ data curves may be acquired by varying the gate voltage between sweeps. A bias voltage ($V_b$) may also be applied to the transistor.

Figure 7:
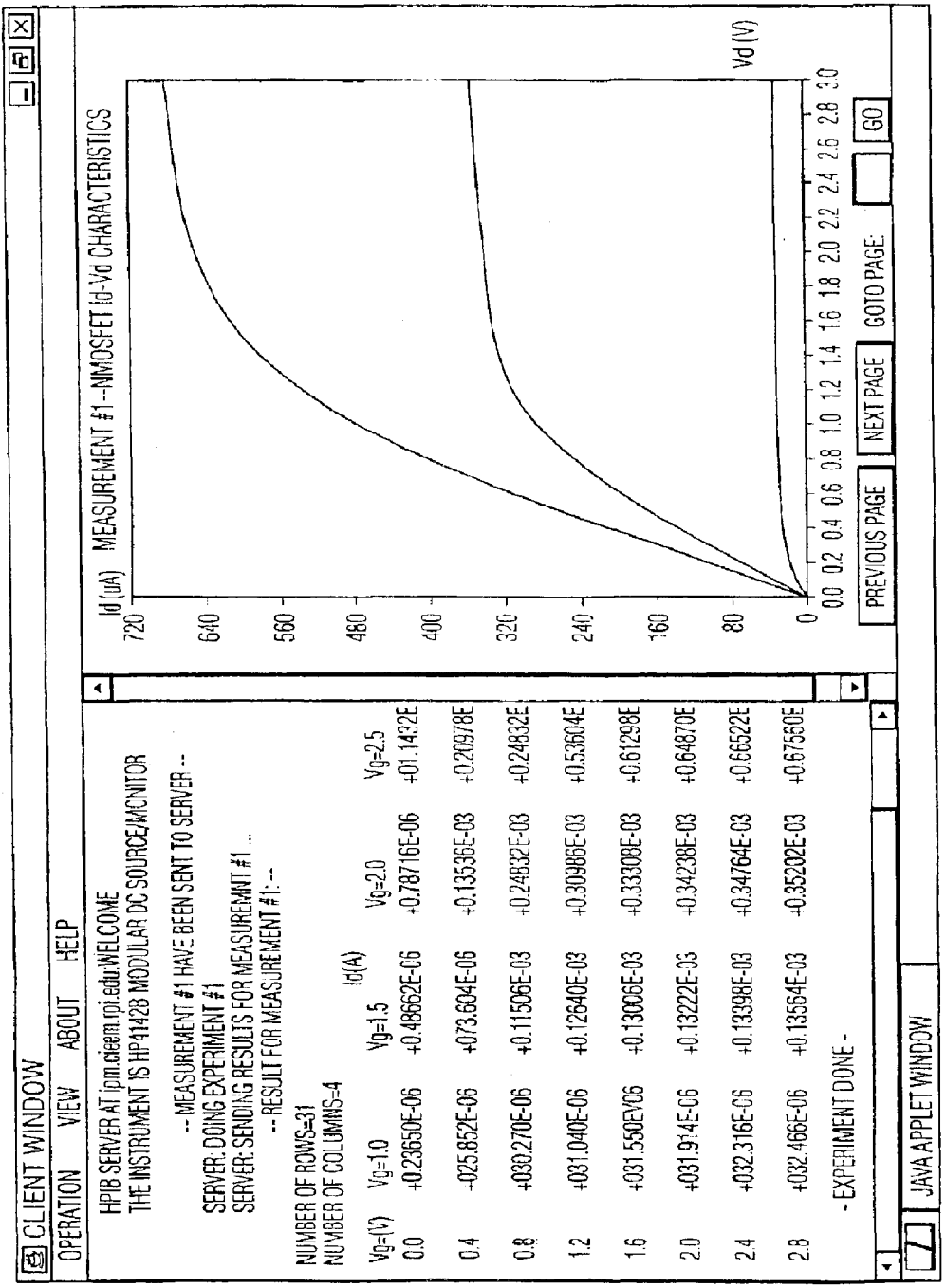
Figure 8:
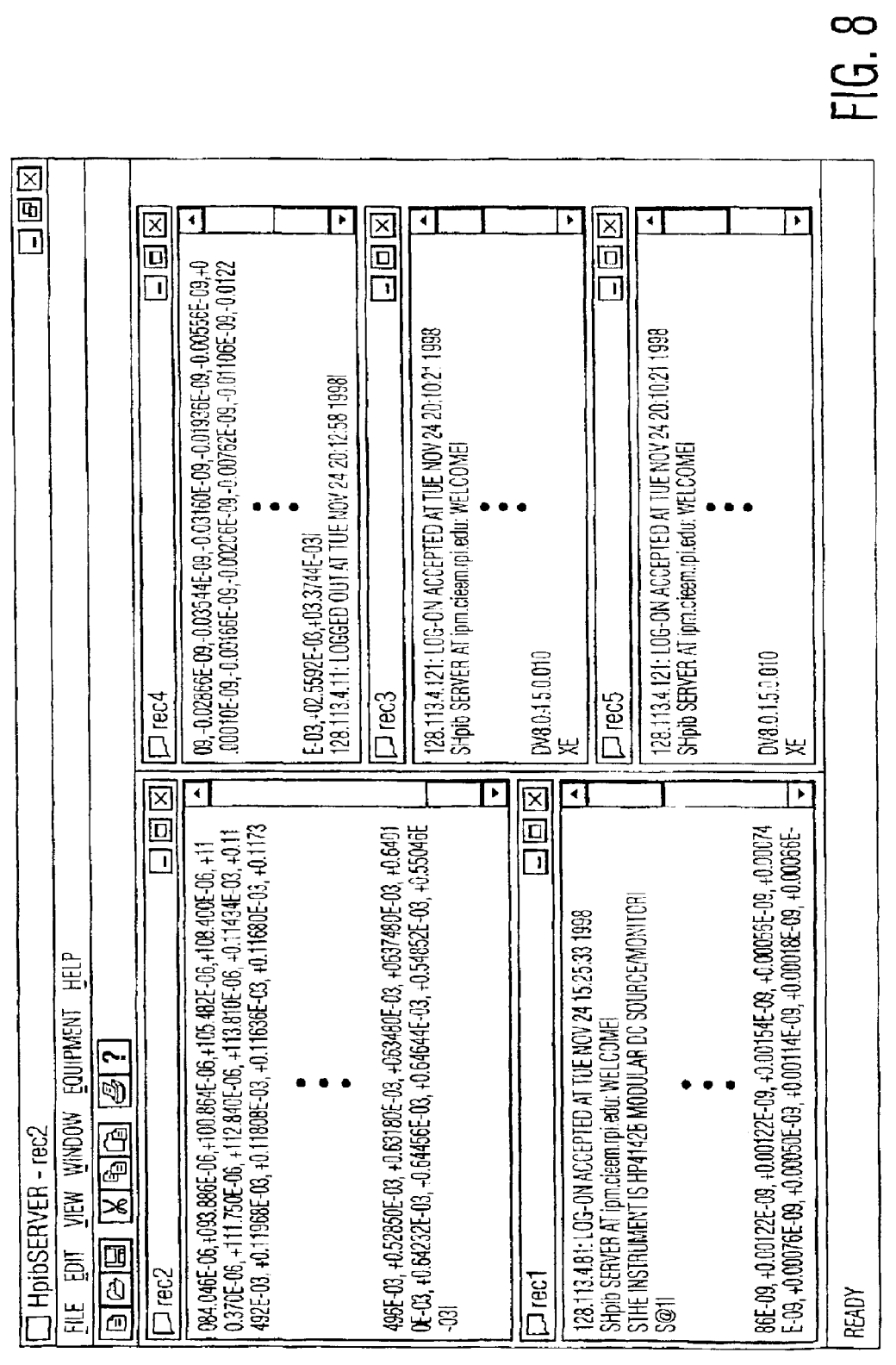

The results of the experiment are displayed to the student, in step 154, and to the instructor, in step 152. In the exemplary embodiment, these displays may be concurrent, with the student viewing tabular and graphical results, as shown in FIG. 7, and the instructor viewing a variety of data for each student running an experiment, including experiment results, as shown in FIG. 8. The results of the experiment may include a message that the experiment is aborted or otherwise interrupted, so that no failure of any experiment request from one student blocks another experiment request from another student.

Figure 6A:
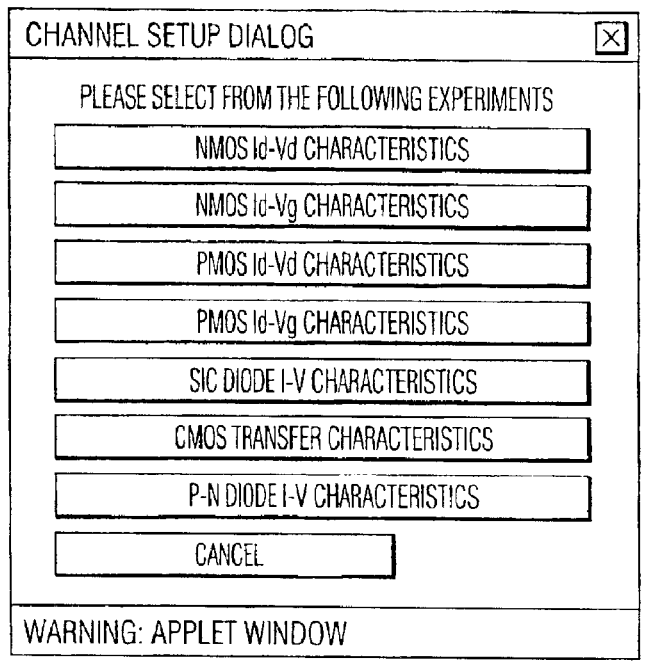
Figure 6B:
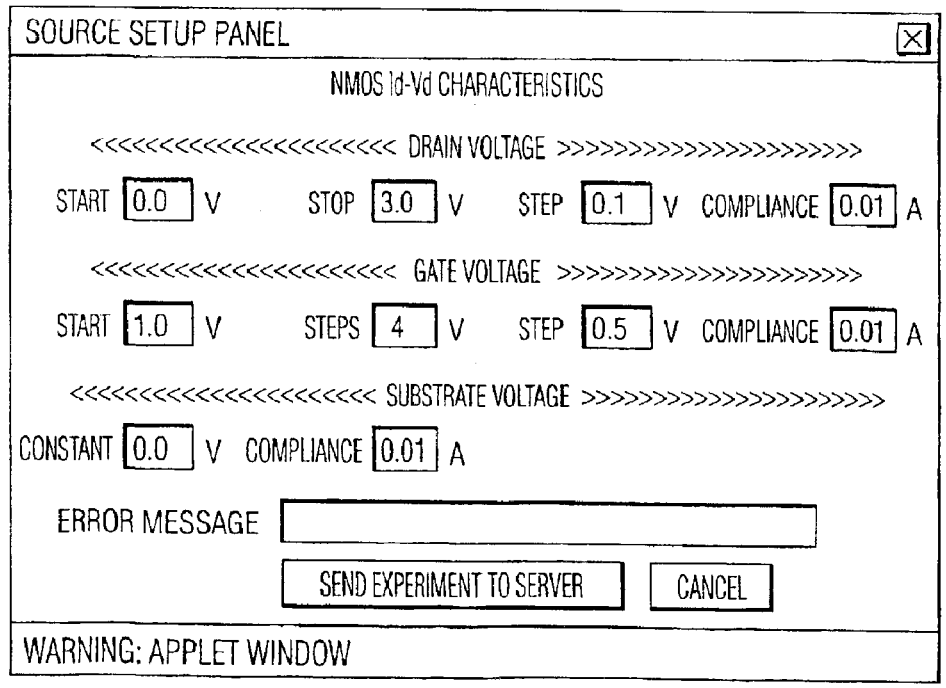

In steps 156 and 158, instructor and student may dialogue concerning the experiment. In one embodiment, a message from the instructor to the student may be placed in message window 624 shown in FIG. 6. Other means of communication may include entail or telephone.

Figure 2A:
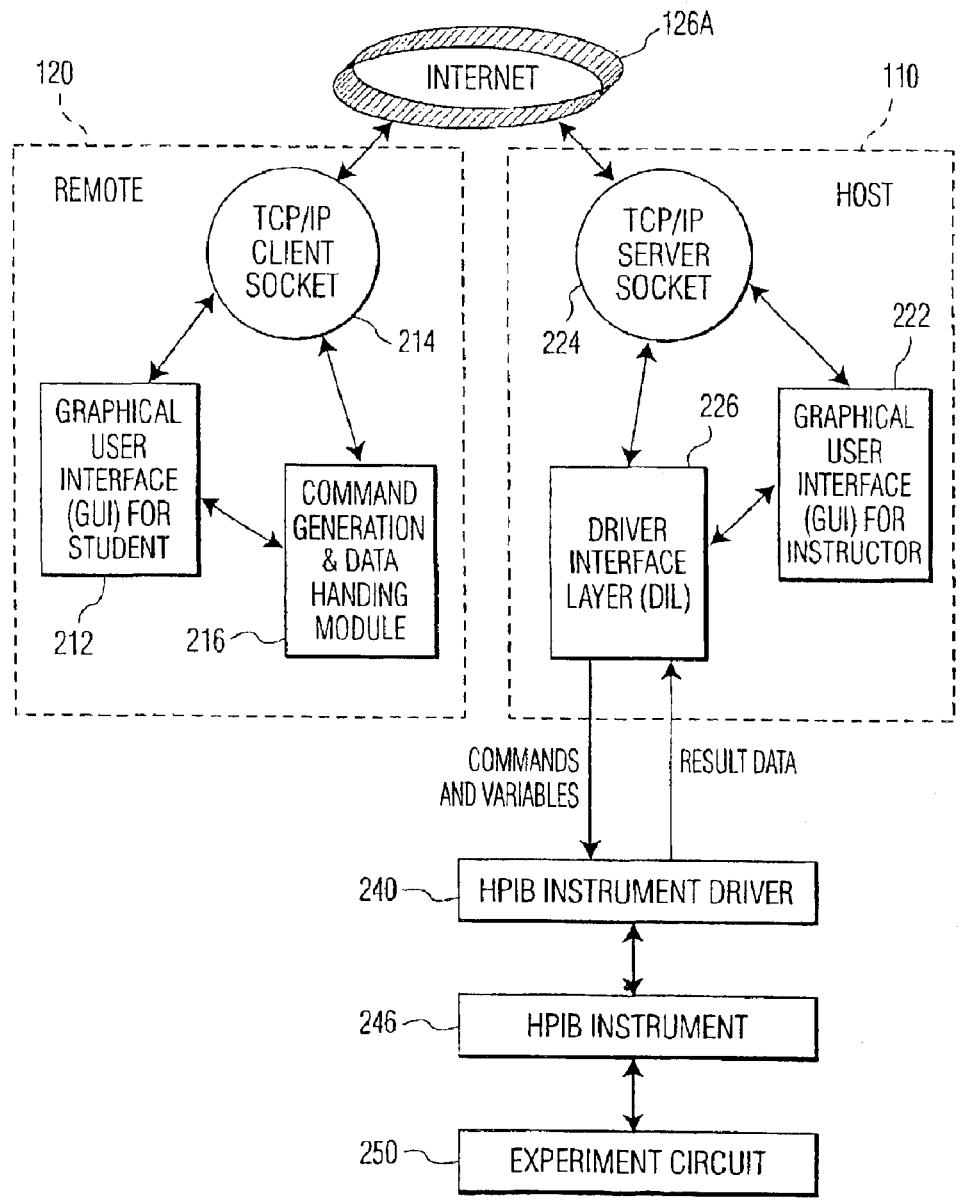
FIGS. 2A and 2B illustrate embodiments of the present invention, showing alternativesystem structures.
Figure 2B:
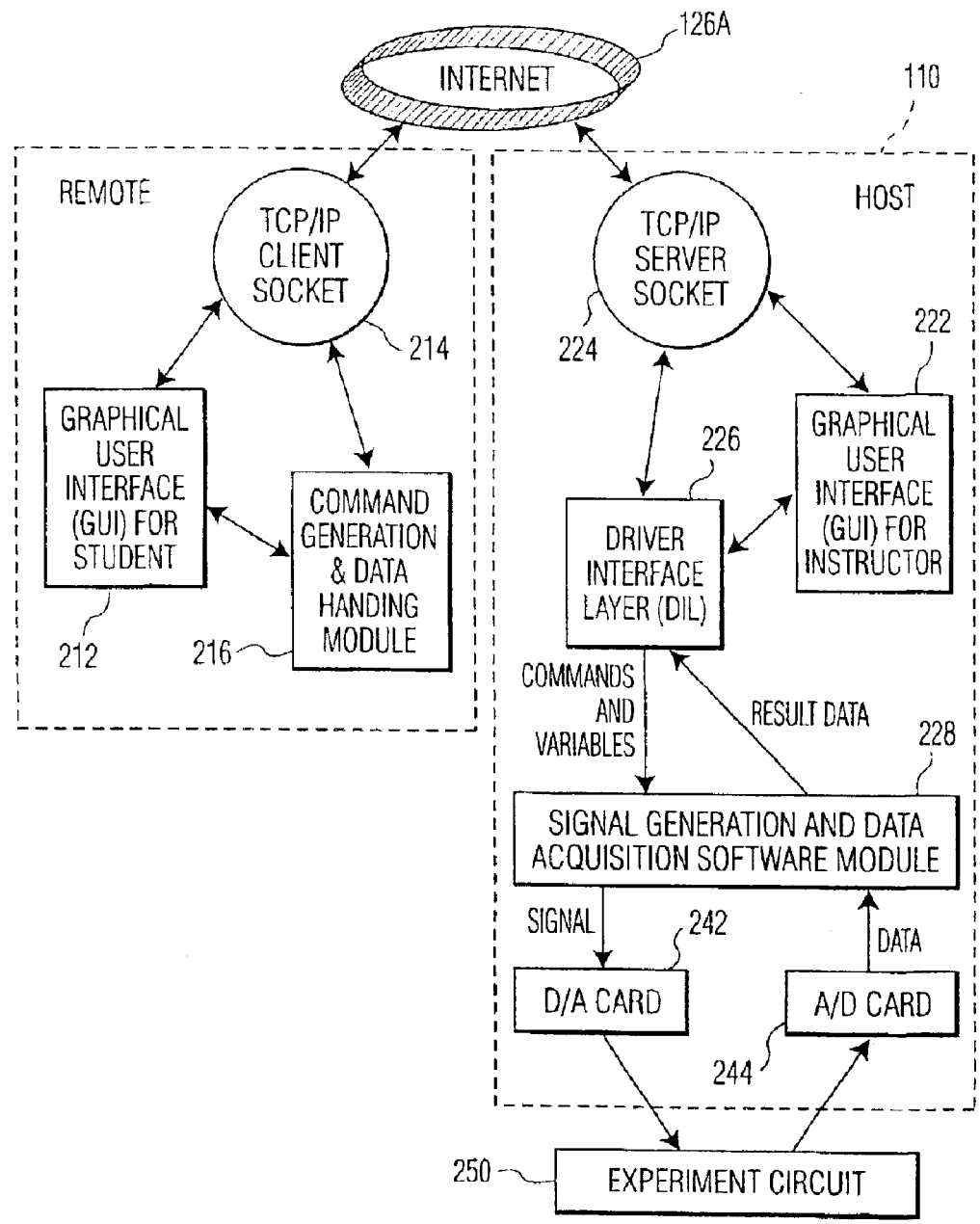

FIGS. 2A and 2B show two embodiments of the present invention. One embodiment illustrates host computer 110 controlling an instrument that conducts the experiment, while the second embodiment shows host computer 110 controlling the experiment directly. In the first embodiment, shown in FIG. 2A, a Hewlett Packard HP4142B Source/Monitor 246 interfaces with host computer 110 through instrument driver 240. Instrument driver 240 provides proper interface for the command signals from host computer 110 to stimulate experiment circuit 250. Similarly, instrument driver 240 provides proper interface for test results from experiment circuit 250 to host computer 110. Analog-to-digital conversion of data from the HPIB to the host computer and digital-to-analog conversion of data from the host computer to the HPIB are included is in instrument driver 240.

Also shown in FIG. 2A is host computer 110 communicating with remote computer 120 by way of a network, such as Internet 126A, using a client/server paradigm. A client/server paradigm is a communication in which a client process on a remote computer forwards a request to a server process on a host computer. The host computer performs the requested operation, and returns a response to the remote computer. The client/server paradigm as implemented in the present embodiment of the invention allows for a host computer, at a central location with an experiment, to process requests from a plurality of remote computers. Host computer 110 includes a server written in Microsoft Visual C++ with two main components. One of the components is a TCP/IP (Transmission Control Protocol/Internet Protocol) server socket 224 that sends and receives commands over Internet 126A. The second component, the Driver Interface Layer (DIL) 226, interfaces between the instrument driver and the higher levels of the server. DIL 226 sends commands to instrument driver 240, which uses the HPIB IEEE 488.2 standard protocol to drive the instrument.

The server allows multi-user access and multiple requests to run experiments. The server may run experiment requests on demand in real-time or batch the requests according to a predetermined priority assignment. Experiment failures or errors caused by the student do not lead to malfunction of the server. If any experiment takes a long time to finish, suggesting a failure, the experiment is discarded so it does not affect other experiments. Upon launching the server application, all information on the available experiments is read from a file prepared by the instructor.

Also included in host computer 110 is graphical user interface 222 which allows instructor 112 to monitor and control the other two components of the server process as well as modify configurations of the experiment. TCP/IP server socket 224 communicates with remote computer 120. Upon launching the server process on host computer 110, information on the experiment is read from a file prepared by the instructor, and is sent to remote computer 120 at log-on time of the student.

The client process in remote computer 120 includes a Java applet that originally appears as a push button on the laboratory website. When the student presses the button, the applet creates a pop-up window through graphical user interface 212 and allows the student to select an experiment. Command generator and data handling module 216 issues commands according to parameters chosen by the student and sends them via TCP/IP client socket 214 to host computer 110. The experimental results sent back via the Internet are then processed by graphical user interface 212 and displayed.

Host computer 110 does not parse or interpret the commands. It assumes that command generator and data handling module 216 on remote computer 120 correctly generates the commands. In the case of an error, host computer 110 discards the commands. This reduces the processing overhead of host computer 110. When the experiment is changed, host computer 110 sends a message about the change to remote computer 120.

No files need to be downloaded to remote computer 120 in order to perform the experiments. The student only has to access the laboratory website and start the client process with the press of a button. The client process behaves like a stand-alone application in which the student may select an experiment by activating the pop-up dialog. The resulting data and plots may be saved by the student using the "copy and paste" function of Windows.

The second embodiment is shown in FIG. 2B. The difference between the first and second embodiments is that HP instrumentation 246 is replaced with a set of PCI/ISA cards 242 and 244 that may be installed in expansion slots of host computer 110, and instrument driver 240 is replaced with signal generation and data acquisition software module 228, which may be a commercially available package, residing in host computer 110. Commands from Driver Interface Layer (DIL) 226 are sent to signal generation and data acquisition software module 228, which in turn sends a digital signal to digital-to-analog (D/A) card 242, to stimulate experimental circuit 250. Analog results are returned to analog-to-digital (A/D) card 244, which in turn converts the results into digital data.

Although not shown in FIGS. 2A and 2B, instructor and student may exchange dialogue using Internet 126A concerning the experiment. Instructor may also use Internet 126A to assign homework or additional assignments to students on an individual or group basis.

The system described may be offered to remote students on a global scale is allowing them to obtain hands-on experience in conductor device characterization. This removes a major obstacle for establishing a boundless and completely remote engineering education curriculum. As an added benefit, this technology may offer students an opportunity to work with sophisticated equipment of the kind they are more likely to find in an industrial setting.

Other examples of such use could be a biology laboratory course involving dissection, a chemistry laboratory course involving dangerous chemicals, or a simulator of a complex piece of machinery. Utilizing a remote laboratory in the manner described can permit clients or students to gain familiarity and knowledge with the subject of the experiment without cost of travel. It also reduces wear and tear on the instrument and possibility of accident or injury.

Instructor Interface

Figure 5A:
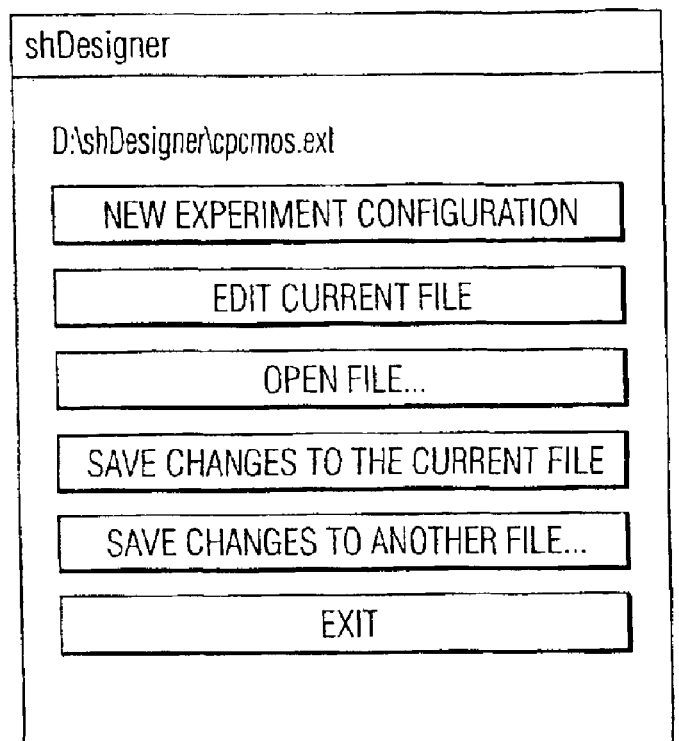
Figure 5B:
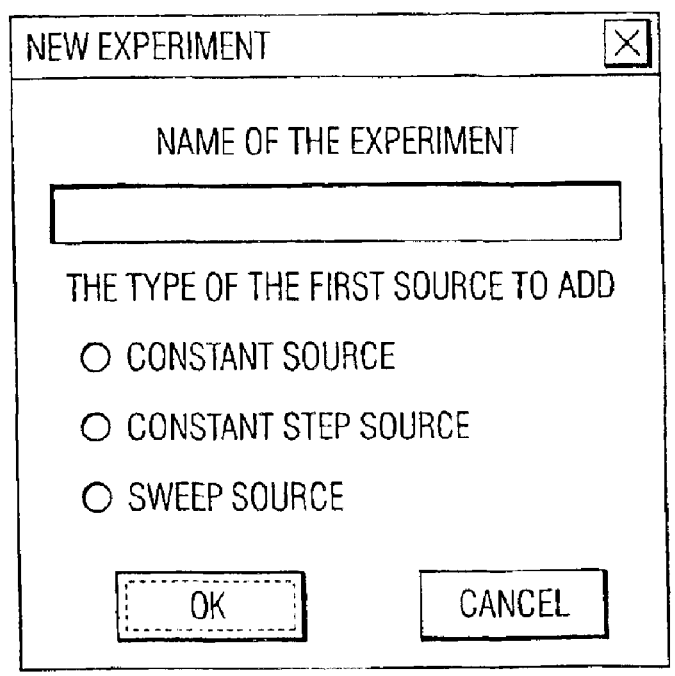
Figure 5C:
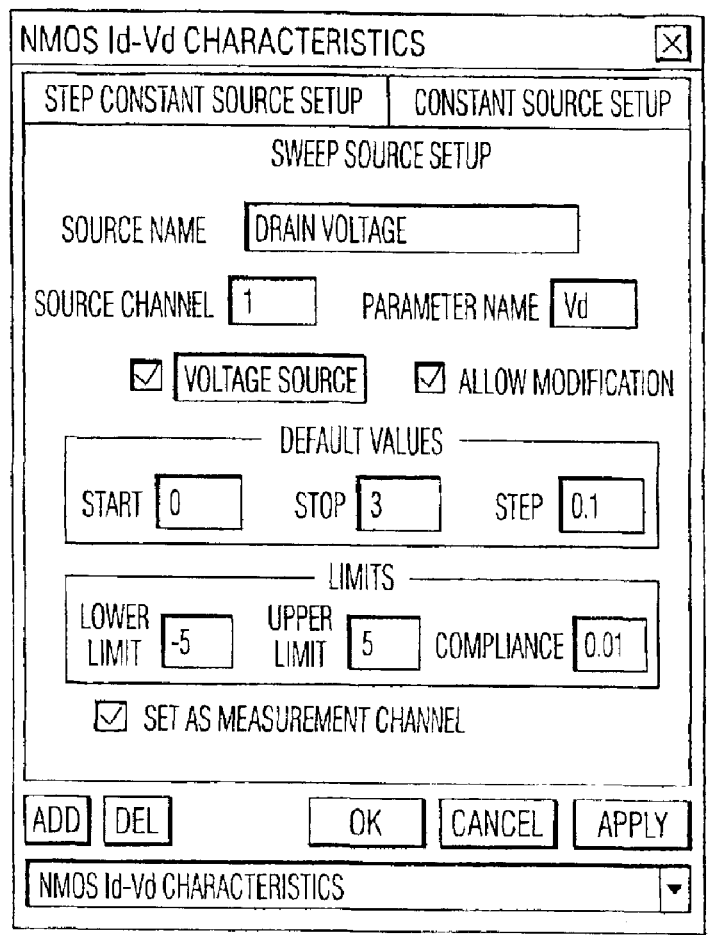

In the exemplary embodiment of the present invention, instructor 112 enters structural components and input parameters and variables of experiment 118 into host computer 110 using the screens shown in FIGS. 5A–5D. Host computer 110 stores experiments as experiment configurations, each of which contains at least one experiment. Application dialogs as shown in FIG. 5A provide options for the instructor to work on experiment configurations. For each experiment of an experiment configuration, a property sheet (FIG. 5C) is implemented as a pop-up window for each input source. To edit setup information for a source, the instructor accesses the corresponding property page using a pull-down menu. The instructor may add (ADD) or delete (DEL) an experiment from the configuration.

Each experiment includes title of the experiment, number of sources employed in the experiment, setting of the sources, channel of which data can be extracted, symbol of the data, and data type (current or voltage). The setting of each source includes name of the source, parameter symbol of the source, channel—physical unit the source is connected to, whether source outputs a voltage or a current, whether the source is a constant source, step constant source, or sweep source, default values of the input parameters and variables of the source, safety limit of the source, and compliance limit of the source.

The output of a constant source remains constant during the experiment, and the output of a sweep source may change in staircase form. The output of a step constant source may remain steady for a portion of the experiment, and change to another constant value during another portion.

Default values of the input sources are initially shown to the student. The student may modify the values within a tolerance band set up by the instructor. The number and kind of default values depend on the type of constant source (source value, upper and lower limit, and compliance limit), sweep source (start source value, stop source value, step size, upper and lower limit, and compliance limit), and step constant source (start source value, stop source value, number of steps, upper and lower limit, and compliance limit).

When setting up a new experiment configuration, the instructor presses the "New Experiment Configuration" button on the application dialog (FIG. 5A). The instructor enters a name for the experiment in a pop-up dialog (FIG. 5B), and type of first source. A property sheet of the first source is displayed. The instructor edits the default values and limits. Additional sources may be similarly added.

To delete a source from an experiment, the instructor selects the experiment from a pull-down menu, and clicks on the delete (DEL) button. After confirmation, the source is deleted. If this is the last source, the experiment is deleted.

Figure 5D:
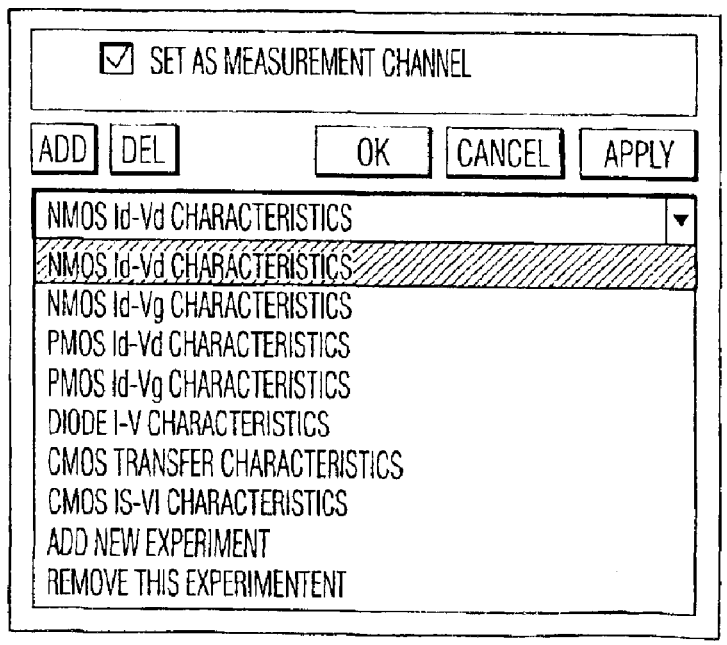

To add an experiment to an existing configuration, the instructor clicks on the "Add new experiment" selection from a pull-down menu (FIG. 5D). The instructor uses the same data entry screens to define the new experiment.

To remove an experiment from a configuration, the instructor selects "Remove this experiment" from a pull-down menu. After confirmation, the experiment is removed.

The instructor may save modifications made to the experiment by selecting either the OK button on the screen (FIG. 5C) or the APPLY button to save modifications to the experiment. Upon switching to another experiment, the instructor is prompted to save modifications made to the current experiment.

To save a configuration, the instructor may select the "Save changes to the current file" button, or select the "Save changes to another file" button, and type in a file name.

To import a configuration from a file, the instructor may select the "Open file . . . " button on the screen (FIG. 5A), type in the name of the file to retrieve, then edit and save the changes. Selecting the "Exit" button on the screen (FIG. 5A) ends the session.

Instructor 112 may also view the status of each student logged on, including a summary of the results of an experiment, as shown in FIG. 8. Separate windows (for example 810 and 820) display information to the instructor for each student currently logged on. Each logon by a student creates a dedicated window on the display of the instructor.

Host Computer Server Processes

Figure 9:
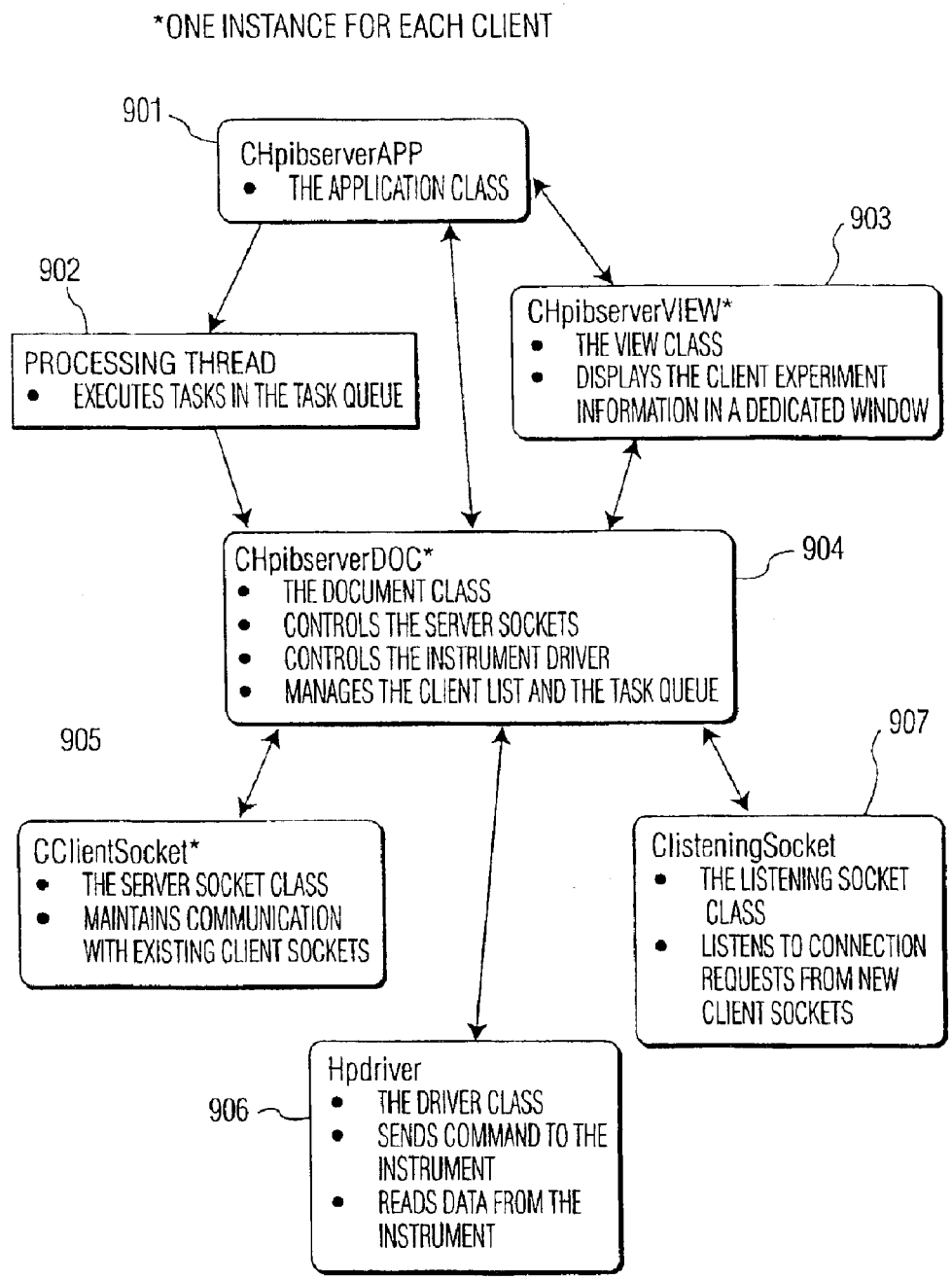
FIGS. 9 to 13 illustrate the objects and processes used by the server process on the host computer in an embodiment of the present invention.

Server processes of the exemplary embodiment of the present invention executed on host computer 110 are shown in detail in FIGS. 9 through 13. Server processes handle communication and process requests from several remote computers 120, stimulate experiment 118, and interface with the experiment instrumentation and with the instructor. Server processes are implemented on host computer 110 in Microsoft Visual C++, as shown in FIG. 9. Communication with remote computer 220 is handled by ClisteningSocket 907, CClientSocket 905, CHpibserverDoc 904, and CHpibserverApp 901. Requests from remote computer 220 are handled by CHpibserverDoc 904, CHpibserverApp 901, and Processing thread 902. Communications with the experiment are controlled by Hpdriver 906. Viewing of the client experiment is handled by CHpibserverView 903. These processes run concurrently on host computer 110, so that an experiment request from one client may be received and placed on a task queue, while a previously requested experiment by another client is running.

Figure 10:
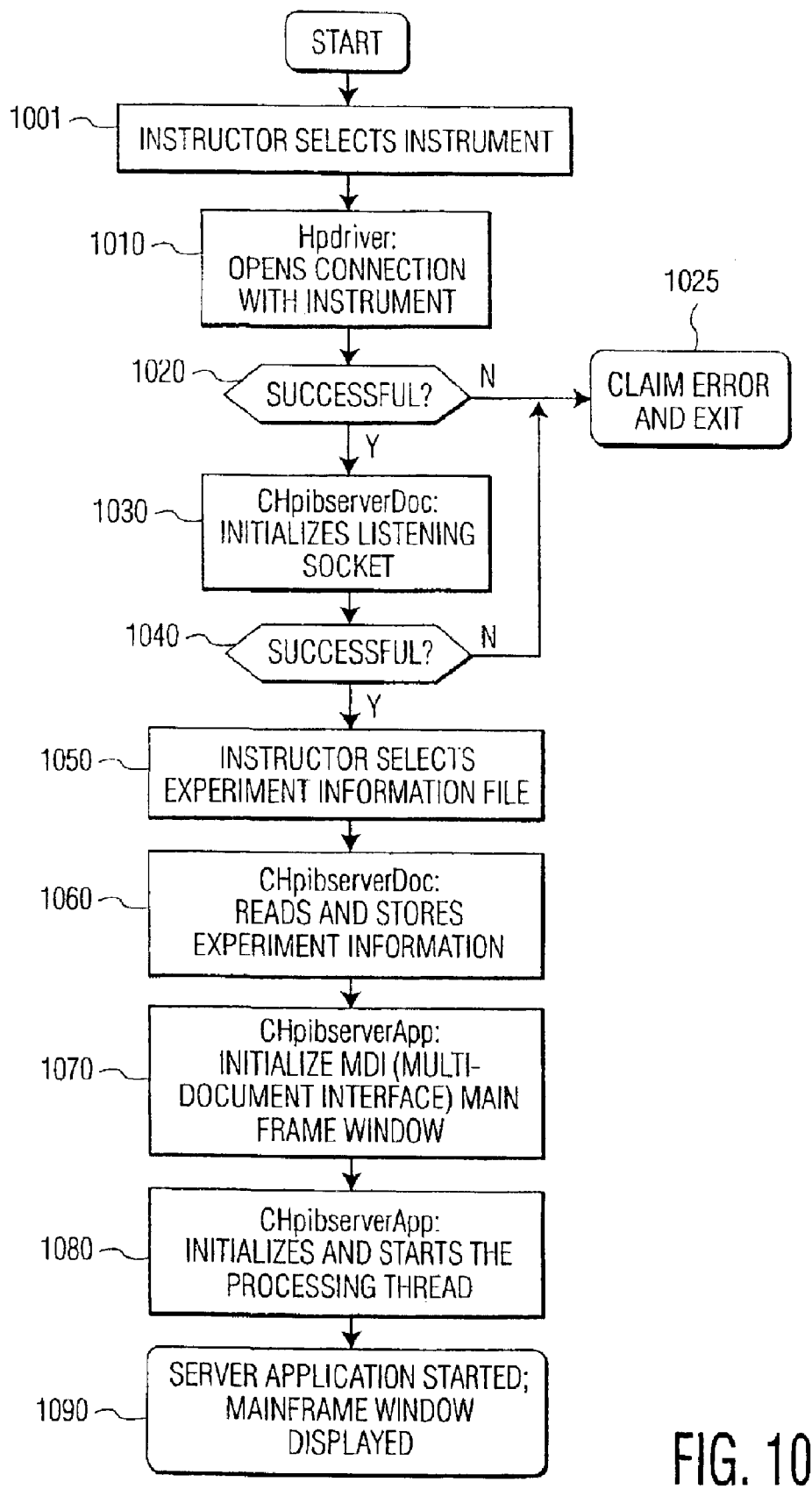

FIG. 10 shows the steps included in the start up of the server. Instructor 112 selects an instrument for the experiment and opens a connection with the selected instrument in steps 1001 and 1010. The instructor initializes a listening socket to communicate with remote computers over the Internet, in step 1030. The instructor selects and stores an experiment information file, as explained previously, in steps 1050 and 1060. CHpibserverApp 901 initializes graphical user interface 224 for instructor 112 in step 1070, and also initializes and starts the processing thread, in step 1080. Error handling is performed as shown in steps 1020, 1025, and 1040. In step 1090, host computer 110 waits for a request from a remote computer.

Figure 11:
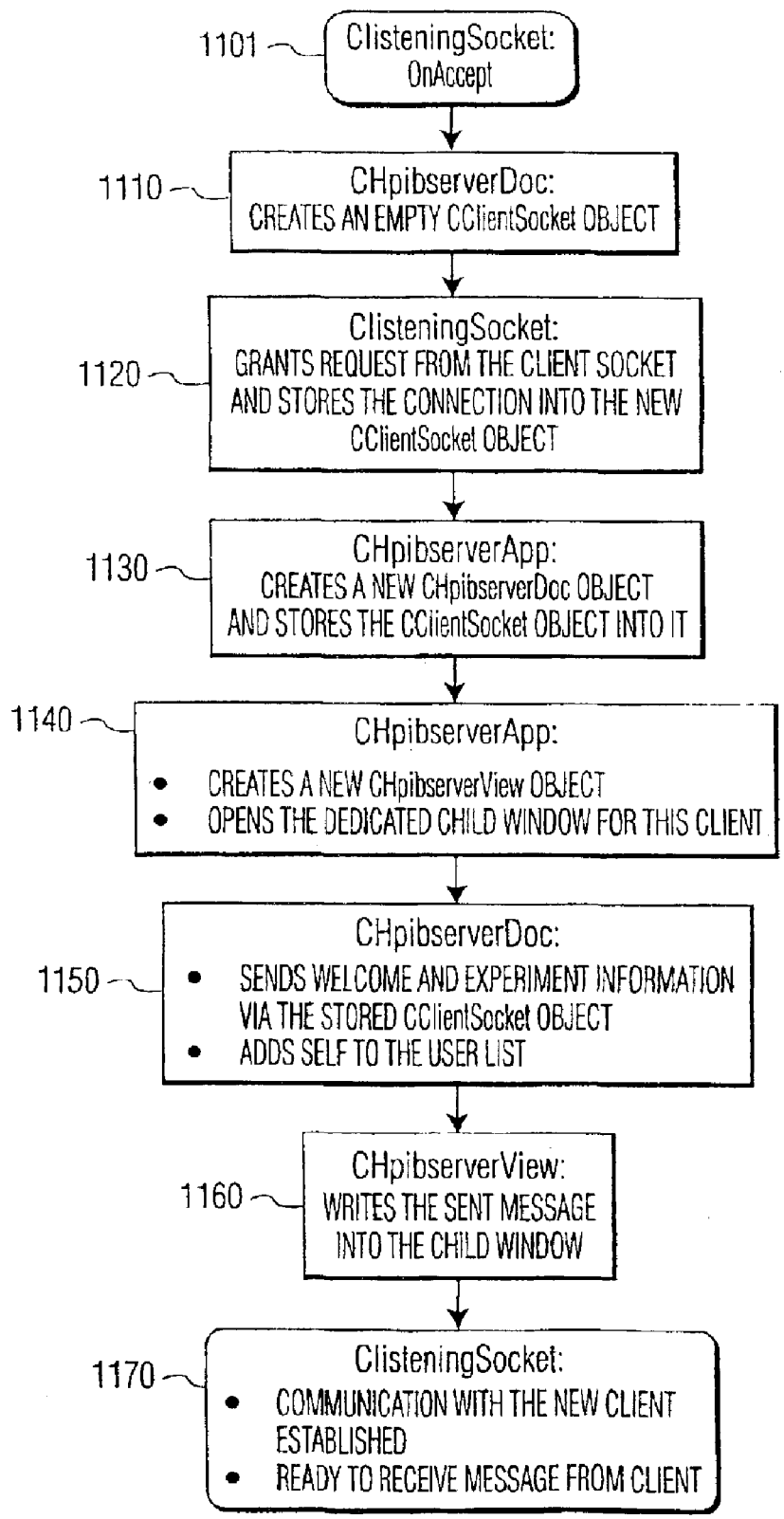

FIG. 11 depicts the steps included in a new client connection to host computer 110. Detection and reading of a request from a remote computer is performed as shown in steps 1101, 1110, 1120, and 1130. A new dedicated window is opened for the new client, in step 1140. CHpibserverDoc 904 sends welcome and experiment information to the new client, and writes the message sent to the dedicated window, in steps 1150 and 1160. In step 1170, the listening socket waits for a message from remote computer 120.

Figure 12:
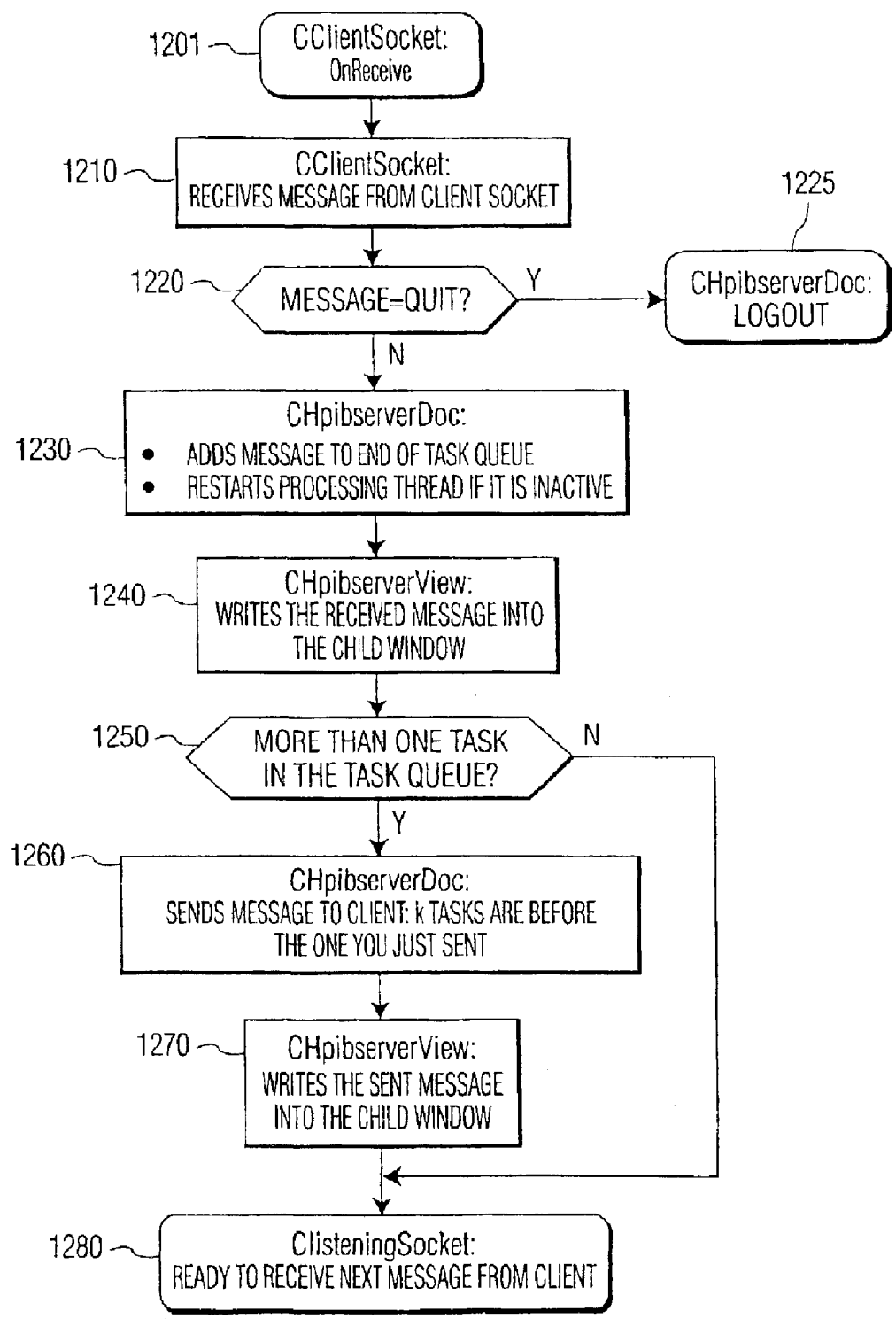

Steps for handling communication from a remote computer are shown in FIG. 12. A request to perform an experiment is detected and placed on a task queue, as shown in steps 1201, 1210, 1120, 1230, and 1240, to permit scheduled or batch processing. Host computer 110 notifies remote computer 120 if other experiment requests are ahead of the received request, in step 1260. The notification message is written in to the dedicated display window in step 1270. If a QUIT message is received in step 1220, logout is performed by step 1225. After writing the message into the dedicated window, the CListening socket waits for another request from remote computer 120, in step 1280.

Figure 13:
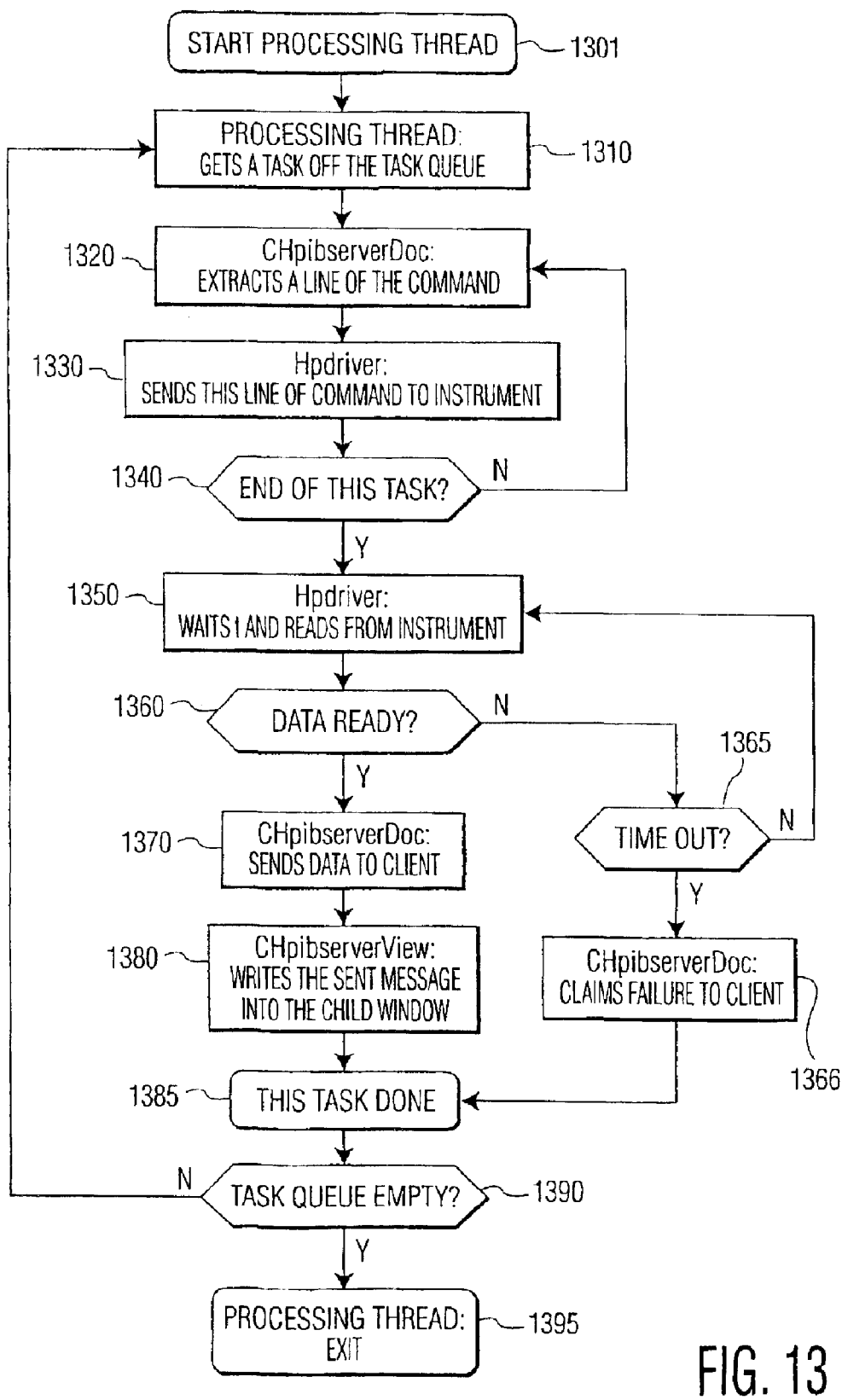

Processing of a task between the host computer and the experiment instrument begins in step 1301 shown in FIG. 13. A task is retrieved from the task queue by step 1310 and sent to the instrument line-by-line by steps 1320 and 1330. Hpdriver 906 waits for a response from the instrument, according to a predefined interval of time, in step 1350. Hpdriver 906 reads data from the instrument or times out (steps 1360, 1365, and 1366). Results are sent to remote computer 120 and written to the dedicated window in steps 1370 and 1380. When the task is completed (step 1385), another task is obtained from the queue and performed line-by-line. This continues until the queue is empty (steps 1390 and 1395).

Remote Computer Client Processes

Figure 14:
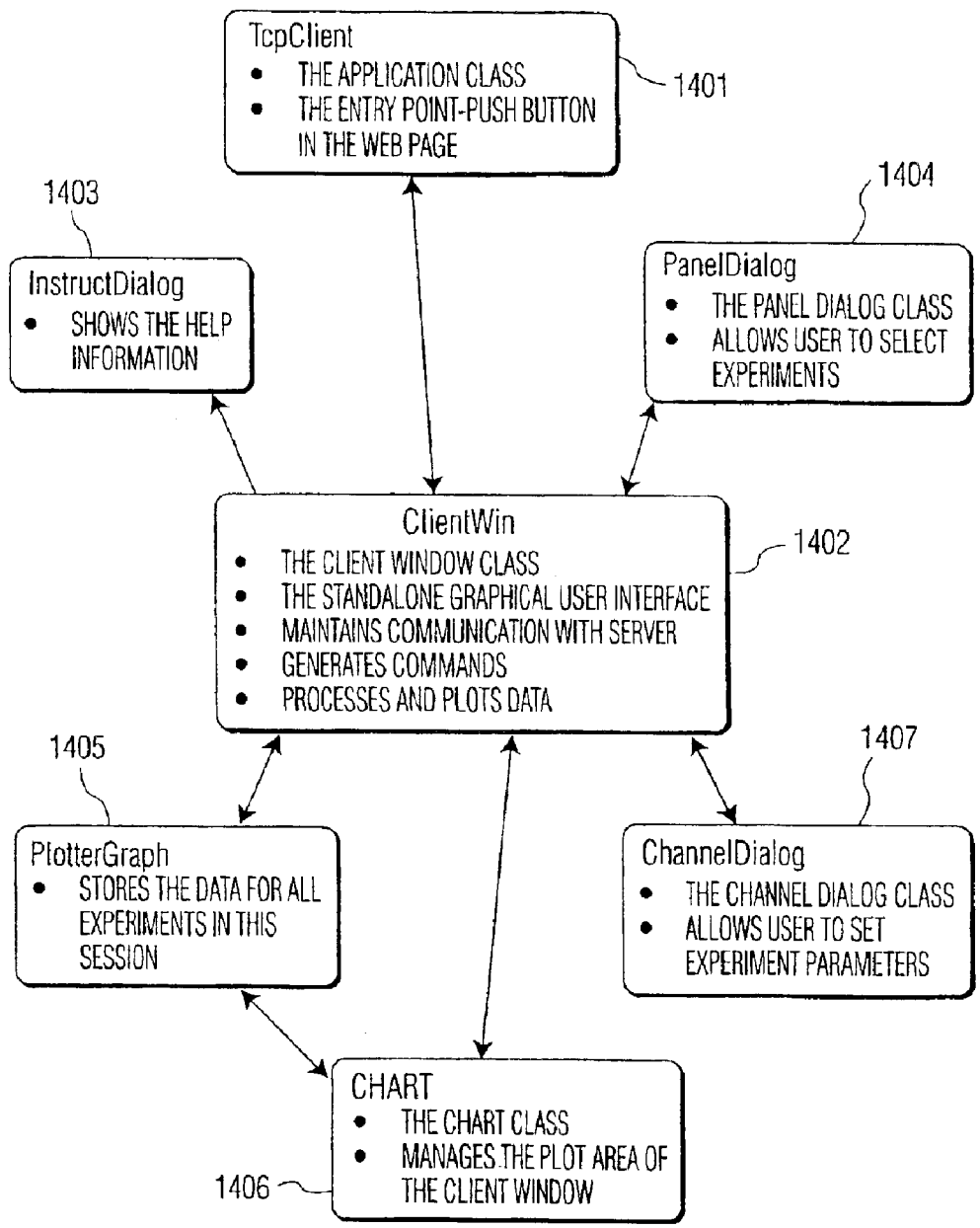
FIGS. 14 to 19 illustrate the objects and processes used by the client process on a remote computer in an embodiment of the present invention.

Client processes as shown in FIGS. 14 to 19, are executed by remote computer 120 to handle communication with host computer 110 and Internet 126A, set experiment parameters and obtain results of the experiment. No files need to be downloaded from host computer 110 to perform the experiment. The client processes are implemented in Java. The main client classes are shown in FIG. 14, and include TcpClient 1401, ClientWin 1402, ClientWin 1402, PanelDialog 1404, InstructDialog 1403, Chart 1406, PlotterGraph 1405, and ChannelDialog 1407.

Figure 15:
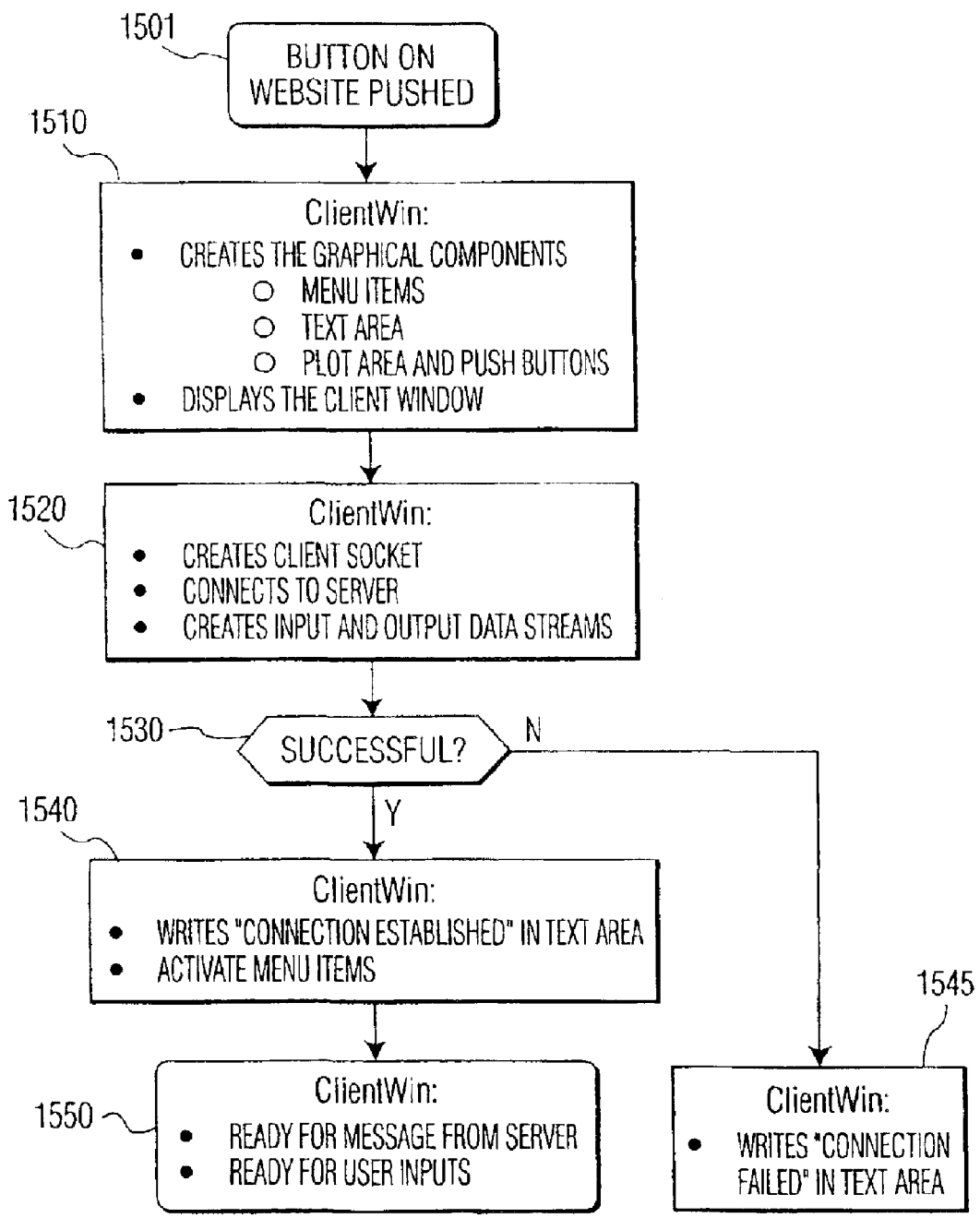

A connection between remote computer 120 and host computer 110 is established by the client as shown in FIG. 15. The client accesses the lab website in step 1501 by the push of a button using a standard Web browser. ClientWin creates the graphical components and displays the client window (step 1510). A client socket attempts connection to the server (step 1520). If connection is successful (step 1530), ClientWin informs the client that connection is established and activates the menu items (step 1540). ClinetWin is now ready for receiving messages from the remote server and the client (step 1550). If connection attempt is not successful, ClientWin writes "Connection failed" in the text area (step 1545).

Figure 16:
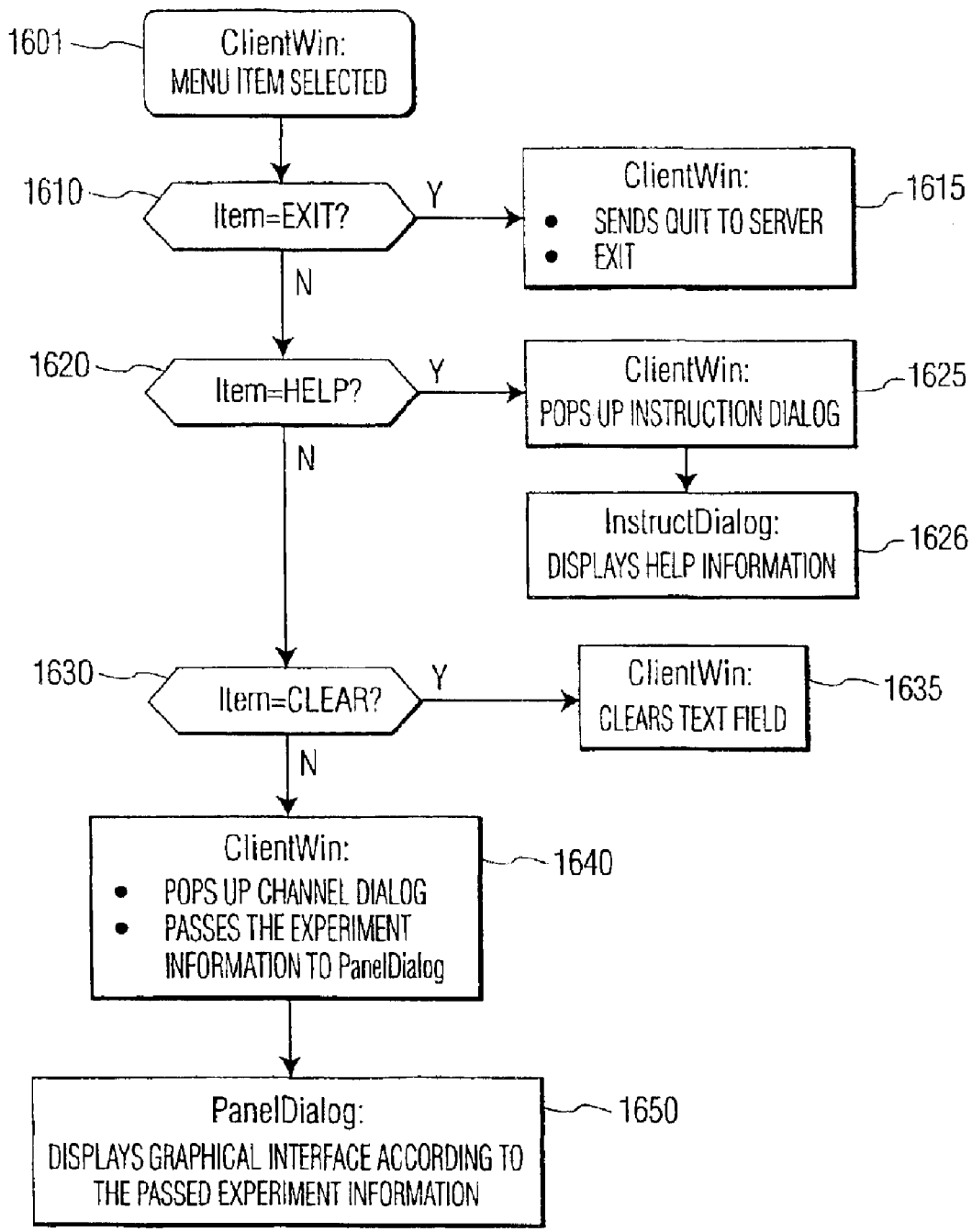
Figure 17:
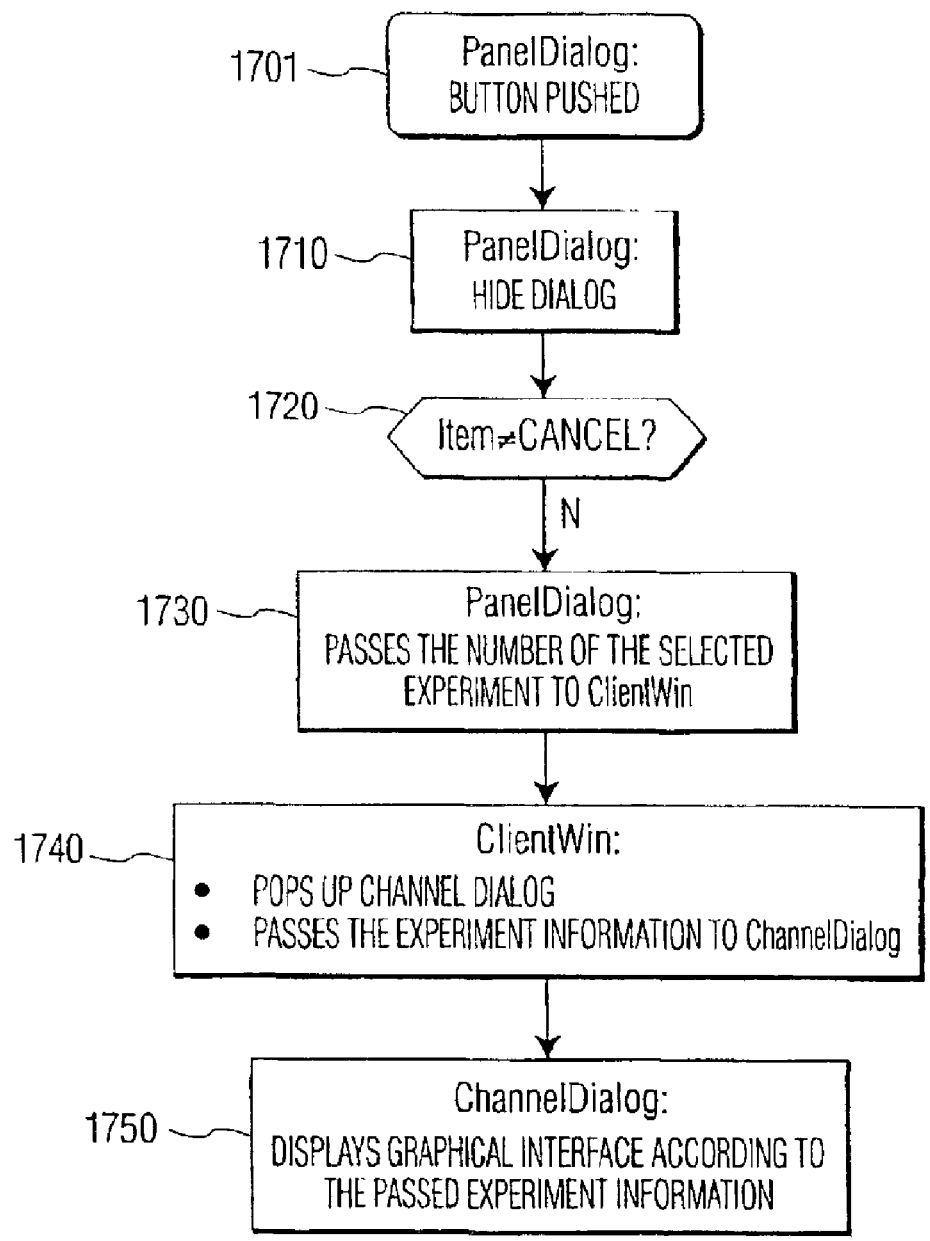

The client window user input process is shown in FIG. 16. The client may select various menu items, such as EXIT, HELP, and CLEAR (step 1601). If EXIT is selected (step 1610), the server is so informed (step 1615). If HELP is selected (step 1620), ClientWin obtains and displays help information to the client (steps 1625 and 1626). Clearing of text is performed in step 1635. ClientWin passes experiment information to PanelDialog in step 1640. PanelDialog displays graphics in response to the experiment information received from PanelDialog in step 1650. The PanelDialog user input processing flochart is shown in FIG. 17 (step 1701–1750). These allow the client to select an experiment from a list of available experiments.

Figure 18:
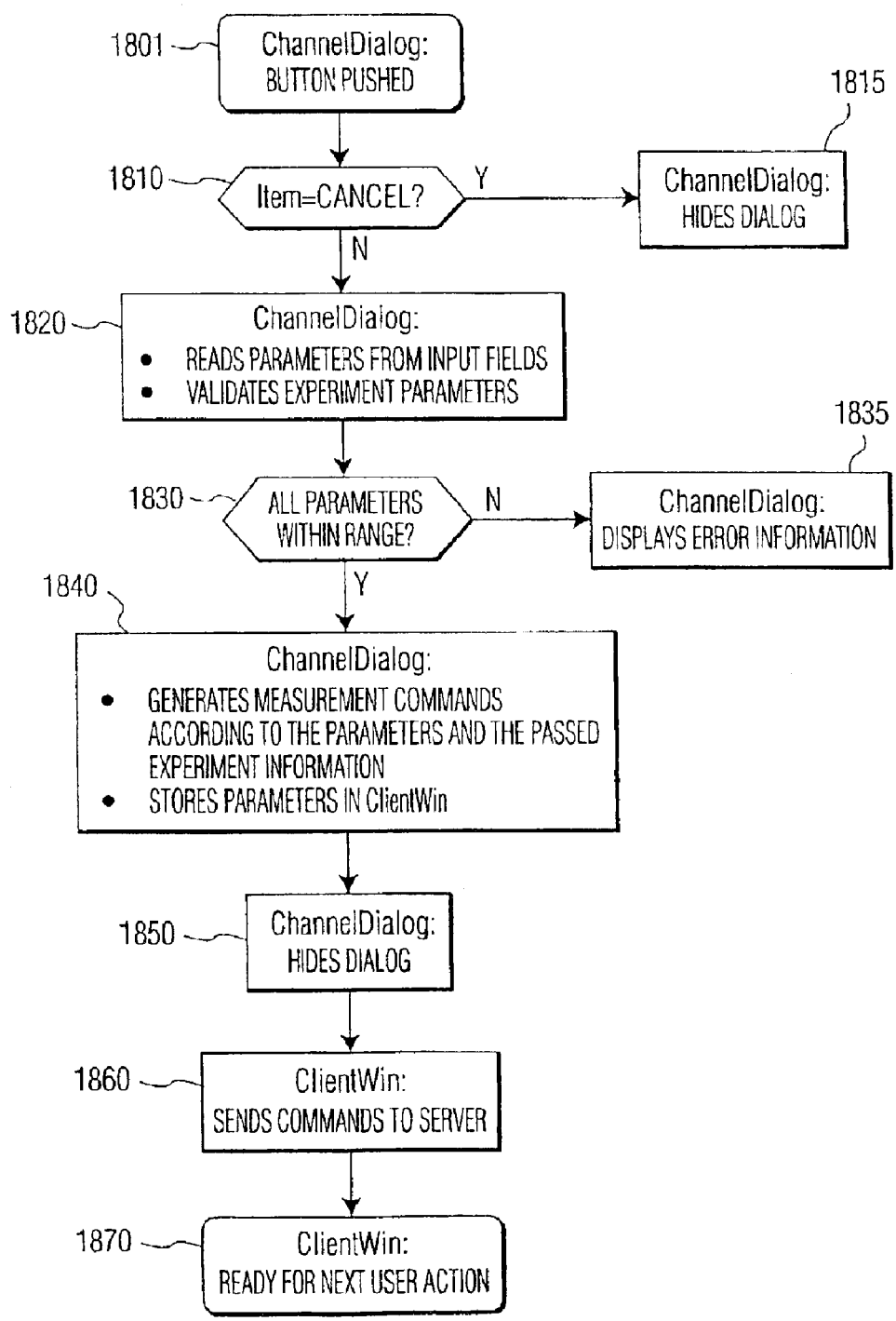

The ChannelDialog user input process is shown in FIG. 18 (steps 1801–1870). The ChannelDialog allows the client to set experiment parameters. Step 1820 reads parameters from the input fields and validates the parameters. If parameters are out of range, an error message is displayed (step 1835). If parameters are within range, ChannelDialog generates measurement commands (step 1840). ClientWin receives the commands from ChannelDialog and send the commands to the remote computer (step 1880).

Figure 19:
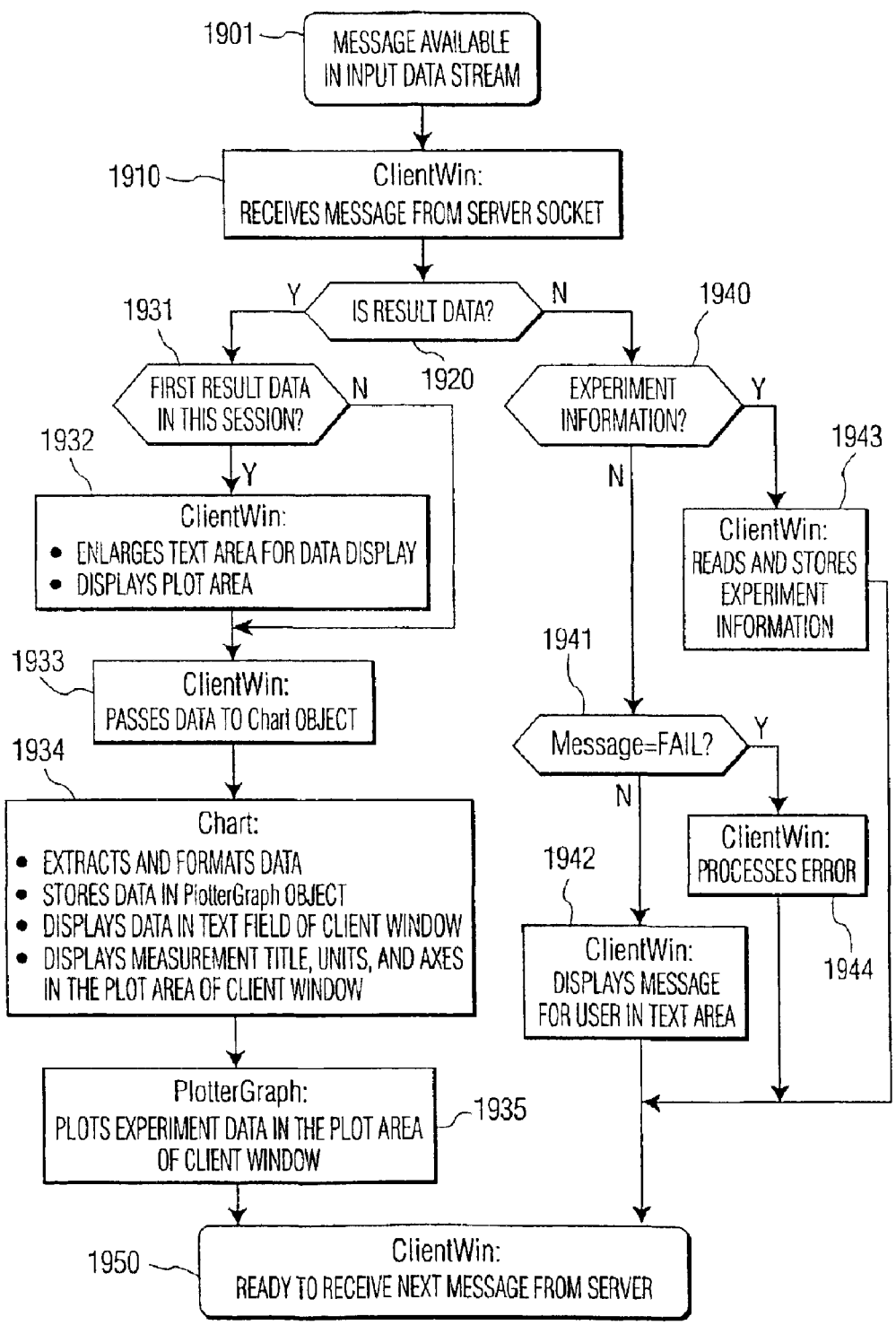

The server message processing flowchart is shown in FIG. 19 and includes steps 1901–1950. ClientWin checks for a message in the input data stream arriving from the remote server (step 1901). The input message may contain either information about the experiment or result data from the experiment. Information about the experiment is read, stored, and displayed to the client in steps 1943 and 1942, respectively. Result data is provided to Chart class 1406 which manages the plot area of the client window (steps 1933 and 1934). PlotterGraph class 1405 plots experiment data in the plot area of the client window (step 1935).

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of a client to remotely conduct a laboratory experiment using a remote computer communicating with a host computer in a computer network, the experiment including a set of output variables dependent on a set of input variables, comprising the steps of:
   (a) setting up by an instructor the experiment at a central location;
   (b) determining by the instructor a tolerance band for each input variable of the experiment;
   (c) restricting by the instructor a range of each tolerance band determined in step (b);
   (d) entering into the host computer a program to run the experiment set up in step (a) and the range of each tolerance band restricted in step (c);
   (e) remotely accessing the experiment by the client using the remote computer; and
   (f) enabling the client to conduct the experiment and simultaneously limiting the client to the range of each tolerance band restricted in step (c).

2. The method of claim 1 including:
   (g) providing results of the experiment at a remote location of the client; and
   (h) concurrently providing results of the experiment at the central location of the instructor.

3. The method of claim 1 in which step (a) includes simulating a circuit having the set of output variables and the set of input variables, and interfacing the set of output variables and the set of input variables to the host computer; and
   step (c) includes restricting by the instructor the range of each tolerance band for each of the input variables from the host computer.

4. The method of claim 3 in which interfacing the sets of output variables to the host computer includes converting at least one of the variables from an analog form into a digital form and at least another of the variables from a digital form into an analog form.

5. The method of claim 4 in which converting the variables is performed inside the host computer.

6. The method of claim 4 in which converting the variables is performed outside of the host computer.

7. The method of claim 1 in which step (e) includes enabling the client to select a value of at least one input variable of the experiment, if the value is within the limited range of a respective tolerance band of the input variable.

8. The method of claim 7 including:
   conducting the experiment in response to the selected value of the input variable, and
   displaying a graph of at least one output variable as a function of the selected value of the input variable.

9. The method of claim 1 in which step (a) includes setting up by the instructor the experiment using one of (a) a circuit and (b) a program simulation of a circuit.

10. The method of claim 1 in which step (e) includes remotely accessing the experiment by the client using the Internet; and
    step (f) includes enabling the client to conduct the experiment by running the experiment at the central location.

11. The method of claim 1 in which the client is a student under instruction from the instructor.

12. The method of claim 11 including exchanging dialogue between the student and the instructor using the computer network.

13. The method of claim 12 including providing homework to the student in response to the dialogue exchanged between the student and the instructor using the computer network.

14. The method of claim 1 in which step (d) includes interfacing the program with a server in the host computer, and
    step (e) includes remotely accessing the experiment by the client using a web browser in the remote computer.

15. A method of a client to remotely conduct a laboratory experiment using a computer network connected between a remote computer having a web browser and a host computer having a server, the method comprising the steps of:

(a) locating structural components and systems of the experiment at a central location;

(b) entering into the host computer a program to run the structural components and systems of the experiment in which the program includes a plurality of input parameters to stimulate the experiment;

(c) interfacing the server of the host computer to the program stimulating the experiment at the central location;

(d) remotely accessing the experiment by the client using the web browser in the remote computer to access the server of the host computer;

(e) providing to the client from the server of the host computer the plurality of input parameters to stimulate the experiment;

(f) selecting at least one of the plurality of input parameters on the web browser of the remote computer;

(g) enabling the client to perform the experiment at the central location in response to the input parameter selected in step (f); and (h) running the experiment at the central location using the program residing in the host computer after enabling the client in step (g).

16. The method of claim 15 in which step (b) includes entering the plurality of input parameters into the host computer including input variables to stimulate the experiment, and restricting each of the input variables to a tolerance band.

17. The method of claim 15 in which step (h) includes starting the stimulation of the experiment by the client using the web browser in the remote computer, and running the experiment at the central location free-of any program residing in the remote computer.

18. The method of claim 15 in which the client is a student under instruction from an instructor, and step (h) includes restricting the running of the experiment by the instructor at the central location.

19. The method of claim 15 in which step (g) includes transmitting a password from the remote computer to the host computer and verifying the password in the host computer.

20. The method of claim 15 in which the computer network includes a plurality of remote computers connected to the host computer, each remote computer operated by a client, and each client performing concurrently steps (d) through (h), the method including the steps of:

(i) receiving a request to conduct an experiment from each client;

(j) stacking each request received in step (i) in a task queue of the host computer; and (k) executing each request stacked in step (j) based upon a predetermined criteria stored in the host computer.

* * * * *